United States Patent

[11] 3,584,959

| [72] | Inventors | Carlo Del Carlo<br>Utica;<br>James M. McMenamin, Livonia, both of, Mich. |
|---|---|---|
| [21] | Appl. No. | 617,967 |
| [22] | Filed | Feb. 23, 1967 |
| [45] | Patented | June 15, 1971 |
| [73] | Assignee | Teeg Research, Inc.<br>Detroit, Mich.<br>Continuation-in-part of application Ser. No. 472,402, July 13, 1965. |

[54] SHAFT POSITION ENCODERS
17 Claims, 3 Drawing Figs.

[52] U.S. Cl. .................................................. 356/117, 250/231, 350/150
[51] Int. Cl. ........................................................ G03b 27/22
[50] Field of Search .......................................... 250/231 SE; 356/117

[56] References Cited
UNITED STATES PATENTS

| 2,880,648 | 4/1959 | Koester | 350/147 |
| 3,427,108 | 2/1969 | Vyce | 356/117 |

Primary Examiner—Ronald L. Wibert
Assistant Examiner—Paul K. Godwin, Jr.
Attorney—Hauke, Gifford & Patalidis ABSTRACT: Instruments capable of determining with precision the angular position of a shaft by projecting a reference beam of modulated polarized light through an analyzer rotating in unison with the shaft. The signal derived from the light passing through the analyzer is compared to the signal derived from the reference beam and the resultant signal is representative of the shaft angular position.

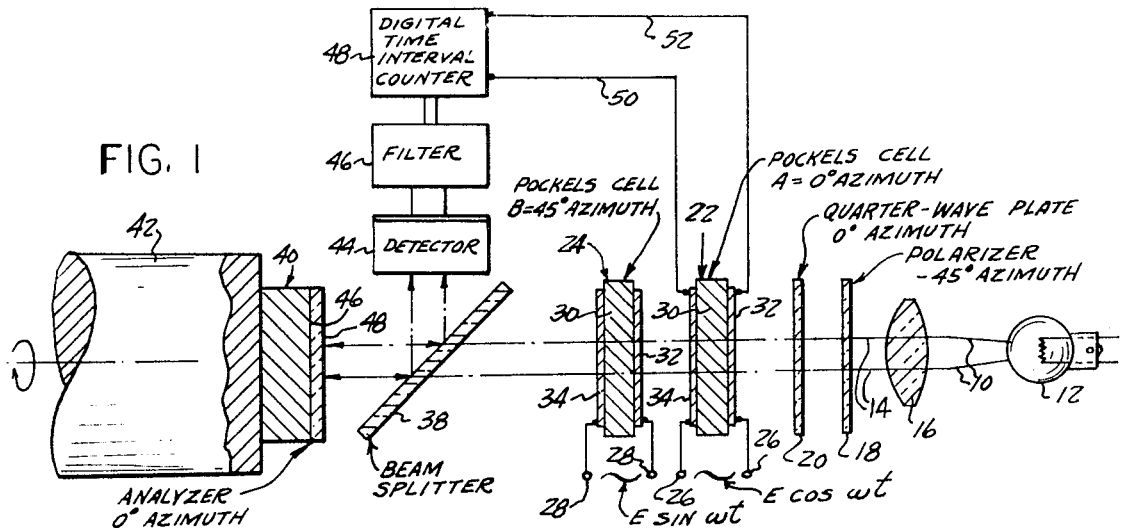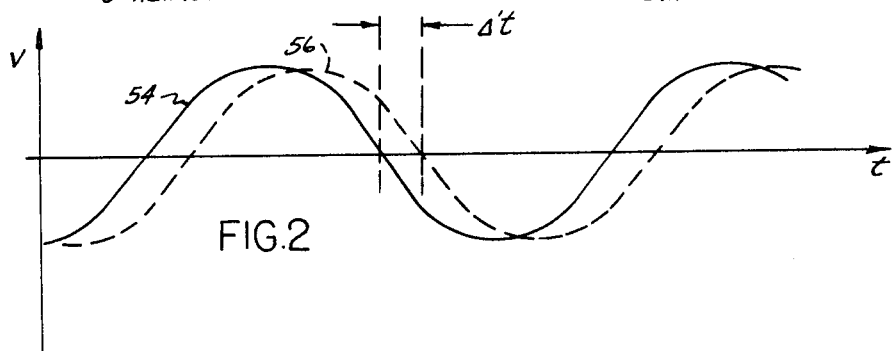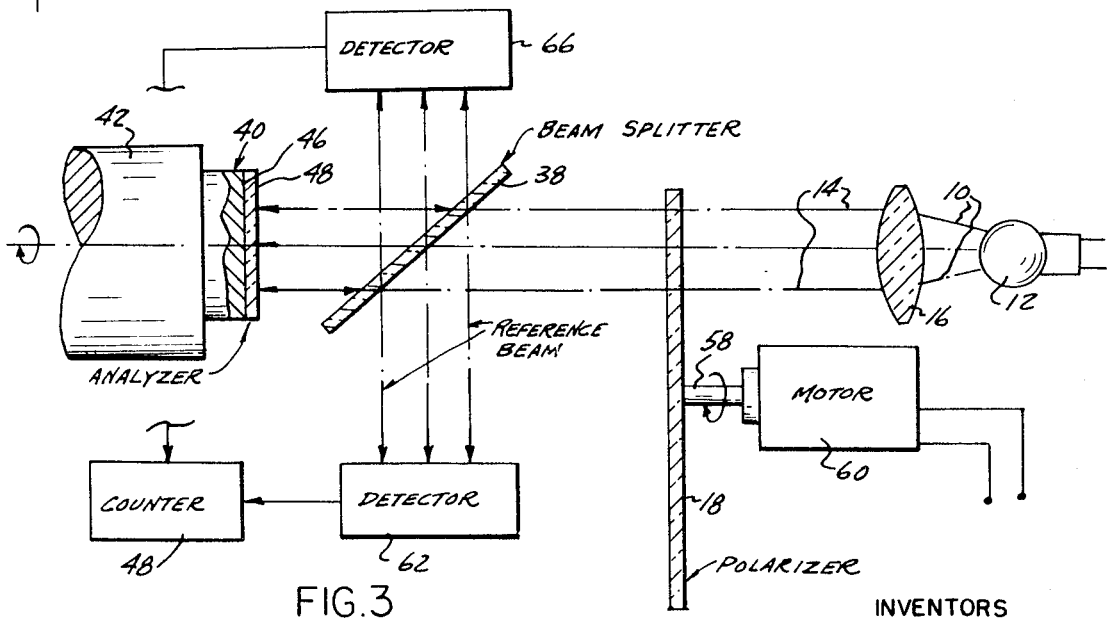

3,584,959

SHAFT POSITION ENCODERS

CROSS-REFERENCE TO RELATED APPLICATIONS

The present application is a continuation-in-part of application Ser. No. 472,402, filed July 13, 1965.

BACKGROUND OF THE INVENTION

The need for precision angle measurement has long been recognized in many fields, especially in the area of celestial navigation. The demand for small instruments with great resolution, capable of operating in extreme environments, has outrun the potential of electromechanical devices. Optical disc-type encoders belong to the mechanical category, since their successful operation depends on the extent to which extremely close mechanical tolerances can be held in their manufacture. The problems involved, for example, in attempting to develop a disc device having a 21-bit resolution amount basically to attempting to improve the art of mechanical fabrication by several orders of magnitude. A satisfactory solution of the problem of manufacturing high precision and high sensitivity shaft encoders demands an entirely new approach rather than a limited attempt to refine the machinist's craft.

SUMMARY OF THE INVENTION

The present invention is based on such a new approach involving, in essence, an interferometer employing polarized light. An instrument based on the principle of the invention is a compact, high resolution device having essentially no moving parts. The resolution of a shaft encoder, according to the present invention, is better than 23 bits. The small size and inherent ruggedness of such an instrument make it ideally suitable for virtually any industrial or military application.

An object of the invention, therefore, is to provide a shaft position encoder of high precision and high sensitivity. Another object of the invention is to provide a shaft position encoder having no or few moving parts, immune to gravity and acceleration, made of a few readily available components and capable of operating in extreme environments for long periods of time.

Other objects and advantages of the invention will become apparent when the following specification is considered in connection with the attached drawings wherein:

BRIEF DESCRIPTION OF THE DRAWINGS

FIG. 1 is a schematic representation of an example of a shaft encoder according to the present invention;

FIG. 2 is a graph useful in explaining the operation of the device of FIG. 1; and FIG. 3 is a schematic representation of another example of a shaft encoder according to the present invention.

DESCRIPTION OF THE PREFERRED EMBODIMENTS

Referring now to the drawings and more particularly to FIG. 1 thereof which represents an example of a shaft encoder according to the invention, a beam of light 10 emitted by a light source 12 is concentrated into a beam of substantially parallel rays 14, by means of a lens system 16. The beam of light 14 then passes through a polarizer 18, which may consist of a prism assembly or an ordinary polarizing filter. The beam of light emerging from the polarizer 18 passes through quarterwave plate 20, for example of quartz, and providing a fixed retardation of the phase between the wave components of the beam of polarized light.

The beam of collimated 5 light emerging from the quarter-wave plate 20 enters a series of two Pockels cells 22 and 24 which are driven by sinusoidal voltages, applied to terminals 26 and 28, differing in phase 90°. Each individual Pockels cell[1] consists typically of a crystal potassium dihydrogen phosphate 30 whose faces are polished normal to the crystallographic Z-axis. When a voltage is applied to transparent electrodes 32 and 34 affixed to these faces, the normally uniaxial crystal 30 becomes birefringent and behaves as a variable retardation or modulation plate with retardation proportional to the applied voltage.

The elliptically polarized light emerging from the Pockels cell train, after passing through a beam splitter 38, is reflected from a mirror-analyzer transducer 40 attached to the end of the rotating shaft 42 and enters a detector 44 by way of reflection on the left-hand face, as seen in the drawing, of the beam splitter 38. The spectral characteristics of the elements in the system combine to impart a mean wavelength to the working beam, which may be measured by an optical compensator such as the Babinet-Soleil[2]. The absence of filters produces more usable light flux in the system.

The beam splitter 38 consists of a semitransparent mirror, and the mirror-analyzer transducer 40, attached to the rotating shaft 42, comprises a mirror portion 46 on the surface of which is attached the analyzer[2][3] portion 48 which may generally consist of a polarizing filter or film.

The signal response of the encoder can be best described through application of the Mueller-Jones calculus[3] which provides, by means of the product of characteristic matrices, an analytical description of the state of polarization of a light beam which has passed through a series of polarization-modifying optical components. Accordingly, the amplitude $y$ of the polarized light incident on the detector 44 is given by:

$$y = \overbrace{\begin{pmatrix} 0 & 0 \\ 0 & 1 \end{pmatrix}}^{8} \overbrace{\begin{pmatrix} \cos\theta & \sin\theta \\ -\sin\theta & \cos\theta \end{pmatrix}}^{7} \overbrace{\sqrt{\tfrac{2}{2}}\begin{pmatrix} 1 & -1 \\ 1 & 1 \end{pmatrix}}^{6} \overbrace{\begin{pmatrix} 1 & 0 \\ 0 & \exp(j\delta) \end{pmatrix}}^{5}$$
$$\overbrace{\sqrt{\tfrac{2}{2}}\begin{pmatrix} 1 & 1 \\ -1 & 1 \end{pmatrix}}^{4} \overbrace{\begin{pmatrix} 1 & 0 \\ 0 & \exp(j\epsilon) \end{pmatrix}}^{3} \overbrace{\begin{pmatrix} 1 & 0 \\ 0 & j \end{pmatrix}}^{2} \overbrace{\sqrt{\tfrac{2}{2}}\begin{pmatrix} -1 \\ 1 \end{pmatrix}}^{1}$$

assuming a lossless system, and adopting the convention of measuring azimuth angles from an arbitrary external reference while looking against the direction of propagation of the beam.

Reading the matrix product from right to left, the first matrix with constant coefficient describes a beam of linearly polarized light of unit amplitude with polarization azimuth at −45° to the reference, due to the presence of polarizer 18.

The second matrix accounts for the action of the quarter-wave plate 20 with optic axis parallel to the reference, introducing a 90° phase shift between the components resolved parallel and perpendicular to the reference.

The third matrix describes Pockels cell A, represented by numeral 22 in FIG. 1, which introduces a phase shift between the components of the polarized light parallel and perpendicular to the reference.

The fourth matrix with constant coefficient resolves the light emerging from Pockels cell 22 into components at +45° to the reference, while the fifth matrix, describing Pockels cell B, represented by numeral 24 in FIG. 1, introduces a phase shift δ between these components.

The sixth matrix with a constant coefficient resolves the light emerging from Pockels cell 24 into components parallel and perpendicular to the reference.

The seventh matrix resolves the light emerging from Pockels cell 24 into components at an angle of +θ from the reference, while the eighth matrix selects the component corresponding to the reference in the θ-rotated system. The seventh and eighth matrices consequently refer to the effect of the analyzer 48, θ being the angular rotation of the analyzer.

Expanding the matrix product results in:

$$y = \sqrt{\tfrac{2}{4}} \sin\theta\{[1+\exp(j\delta)] - j\exp(j\epsilon)[1-\exp(j\delta)]\}$$
$$+ \sqrt{\tfrac{2}{4}} \cos\theta\{[-1+\exp(j\delta)] + j\exp(j\epsilon)[1+\exp(j\delta)]\}$$

The product of $y$ with its complex conjugate $y^*$ gives an expression for the light flux incident on the detector 44. Hence:

$yy^* = \tfrac{1}{2}(1 + \sin\delta \cos\epsilon \cos 2\theta - \sin\epsilon \sin 2\theta)$ ---
[1] Billings, B. H., Journal Optical Society of America 39, 797 (1949).
[2] Jerrard, H. G., Journal Optical Society of America 38, 35 (1948).
[3] Shurcliff, W. A., Polarized Light. Harvard University Press (1962) p. 109.

Applying sinusoidal voltages across the Pockels cells 22 and 24 results in a corresponding modulation of the induced phase shifts according to the relations $$\delta = kE \sin\omega t$$
$$\epsilon = kE \cos\omega t$$

where $E$ is the magnitude of the applied voltage and $k$ is a constant. If $E$ is made small enough so that $\sin\delta = \delta$, and $\cos\delta = 1 - \delta^2$, and similarly for $\sin\epsilon$ and $\cos\epsilon$, $$yy^* = \tfrac{1}{2}\left\{1 + kE \sin(\omega t - 2\theta) - \tfrac{1}{6}k^3E^3\cos2\theta\sin3\omega t - \tfrac{1}{8}k^3E^3\cos2\theta \sin\omega t\right\}$$

The output of the detector 44, then, consists of a DC term, and AC term having the same frequency as the Pockels cell driving voltages but shifted in a phase by an angular amount twice the angular rotation of shaft 42, and two small terms, one at the driving frequency and the other at three times the driving frequency, with amplitudes dependent on shaft rotation. A blocking and filtering circuit 46 passes only the useful working AC signal which is of the form:

$$V = k' \sin(\omega t + 2\theta) \quad (1)$$

where $f = \omega/2\pi$ is the driving frequency, $\theta$ the angular rotation of the shaft, and $k'$ a constant.

The useful output working signal is applied to a digital time interval counter 48 from the output of the filter 46, and the driving signal, which is the same as one of the sinusoidal signals applied to one of the Pockels cells, is also fed into the counter 48, as schematically represented in FIG. 1 by lines 50 and 52 connecting electrodes 32 and 34 of Pockels cell 22 to the counter 48. Consequently, the driving and output signals are used to actuate the digital time interval counter 48, and the time interval corresponding to the shift in phase becomes a linear function of the extent of shaft rotation.

Equation (1) states that a shaft rotation of 180° generates a 360° phase shift in the output signal. Since there are 6.48×10⁵ arc seconds per 180°, the time interval $\Delta t$ corresponding to a rotation of one arc second of shaft 42 is:

$$\Delta t = 1.54 \times 10^{16} f^{11} \quad (2)$$

where $f$ is the driving frequency.

Commercial interval counters currently available are capable of resolving time intervals of $1 \times 10^{19}$ seconds with an accuracy of $\pm 5 \times 10^{110}$ seconds. As an example of such a counter is the model 793 digital time interval counter manufactured by Eldorado Electronics Company of Concord, Calif.

In order to provide $10^6$ to $10^7$ readings per second a computer, not shown, external to the counter may be used to interpolate between successive readings, making use of the readily available, accurate rate information. The maximum error brought about by interpolation is not computer-limited. It depends only on the extent to which acceleration takes place during the 1/54-second interval under consideration, and it is to be noted that the interpolative errors are not cumulative.

Referring now to FIG. 2, there is shown a diagram representing substantially the driving voltage signal 54 applied simultaneously to both Pockels cell 22 and digital time interval counter 48, and the resultant useful working voltage signal 56 read by the detector 44 and applied through filter 46 to counter 48, both curves being shown at substantially the same scale. It can be seen that the signal 56 is out of phase from the driving signal 54 by a time interval $\Delta' t$, this shift in phase $\Delta' t$ being a linear function of the extent of rotation of shaft 42 as hereinbefore explained. The counter 48 thus displays a reading proportional to timer interval $\Delta' t$, such reading being representative of the shaft position, with an accuracy of 0.05 arc seconds.

Referring again to FIG. 1, it is to be noted that the beam splitter 38 and the mirror 40 may be omitted in applications where the detector 44 can be placed within the shaft 42, or proximate the other end of the shaft with an appropriate aperture through the longitudinal axis of the shaft to afford a path for the beam of light 14. It will also be evident to those skilled in the art that the detector 44 may be any optical-electrical transducer and that the digital time interval counter 48 may be replaced by an analog display.

It is important that certain unique aspects of an encoder according to the hereinbefore explained embodiment of the invention be emphasized, such as its freedom from mechanical coupling. True optical coupling is maintained between the encoder head and the rotating shaft 42. The shaft carries an optical transducer 40 which may be made as small as 4 millimeters in diameter by 1.7 millimeters thick with a weight of approximately 50 milligrams. This weight constitutes the only mechanical load imposed on the rotating shaft by the encoder head, and, as mentioned above, by eliminating the beam splitter 38 and the mirror 46 by placing the detector 44 proximate the other end of the shaft, this weight could still be further reduced.

Furthermore, since no bearings whatsoever are incorporated in the device, starting and running torques are nil. This bearing-free design permits the easy adaptation of the encoder head to existing equipment where access to the end of a rotating shaft is readily available. The shaft may, if desired, be located some distance from the encoder.

It should also be emphasized that readout is sensitive only to angular rotations of the shaft 42. Transducer motions generated by shaft end play and runout are ignored.

The characteristics of an interferometric shaft position encoder according to the present invention may be summarized as follows:

Accuracy—0.1 arc second at all angles. Independent of prior rotational history.
Resolution—0.1 arc second.
Power Input—30 watts.
Slew Rate—Unlimited.
Starting Torque—None.
Running Torque—None.
Type Readout—1-2-4-8 BCD; DC levels "0" = (−)0.5 volts nominal;
"1"=(−) 5.0 volts nominal.
Encoder Weight and Volume—Weight 1½ ounces, volume approximately 1 cubic inch, exclusive of electrical leads.
Electronics Weight and Volume—Weight 1 pound, volume 216 cubic inches.
Encoder Life—Approximately 20 years based on average incandescent lamp life, longer for other sources.
Zero Reference—Stable, internal reference is provided in the form of an abrupt 0° to 360° phase shift as the shaft moves across the 0° or 180° position.
Bearing Type—No Bearings.
Bearing Life—Does not apply.
Working Temperature Range—−40 to +65° C.
Absolute Measurement.
360° Operation.

Referring now to FIG. 3 of the drawings which represents an example of a modification of a shaft encoder according to the invention, a beam of light 10 emitted by a light source such as, for example, light bulb 12, is concentrated into a substantially parallel beam 14 by means of a collimeter or lens system 16. The beam of light 14 passes through a polarizer 18 which is continuously rotated by being mounted upon the drive shaft 58 of a synchronous electric motor 60. The beam of light emerging from the polarizer 18 has an axis of polarization which is continuously rotating in synchronism with the rotation of the motor shaft 58.

The rotating linearly polarized light emerging from the polarizer is partly reflected by beam splitter 38 as a reference beam impinging upon reference detector 62. Consequently, the output of detector 62 is a signal representing the modulation frequency of the rotating polarizing angle of the reference beam.

The beam of polarized light passing through beam splitter 38 is reflected from a mirror-analyzer transducer 40 attached to the end of the rotating shaft 42, and impinges upon a second detector 66 after being reflected by the left-hand face, as seen in the drawings, of the beam splitter 38.

The mirror-analyzer transducer 40, attached to the end of the rotating shaft, comprises, as hereinbefore explained with respect to the embodiment of FIG. 1, a mirror portion 46 on the surface of which is attached an analyzer 48 consisting of a polarizing filter or film.

The intensity of the light detected by detector 62 is according to the form:

$$Ir = KI_p \cos^2 \omega t = KI_p \left(\frac{1+\cos 2\omega t}{2}\right),$$

Wherein $I_p$ is the incident light intensity, $\omega$ is the rotation frequency of polarizer 18,
and $K$ is a constant.

The intensity of the light detected by detector 66, assuming that analyzer 48 is angularly oriented the same as analyzer 64, is of the form:

$$I_s = K'I_p \left(\frac{1+\cos 2\omega t}{2}\right)$$

If shaft 42 has rotated of an angle $\theta$, the intensity of the light detected by detector 66 becomes:

$$I_{s1} = K'I_p \left(\frac{1+\cos 2(\omega t + \theta)}{2}\right)$$

Thus rotating the shaft 42 by an angle $\theta$ gives a $2\theta$ shift between the intensities of the lights detected by detectors 62 and 66. This phase shift is indicative of the angular position of shaft 42, with respect to a reference position, and the electrical signals obtained at the output of detectors 66 and 62, which are as shown respectively at 54 and 56 in FIG. 2, are shifted in phase by an amount of $\Delta' t$ and are utilized by counter 48, in the same manner as previously indicated with respect to the embodiment of FIG. 1.

What we claim is:

1. An optical shaft position encoder comprising: rotating polarizer means for producing a beam of polarized light and for modulating the azimuth of polarization of said beam of light; means for analyzing said beam of light, said last-mentioned means rotated in unison with the shaft; and means deriving from said analyzing means a signal representative of the angular position of the shaft.

2. The optical shaft position encoder of claim 1 wherein the means deriving the signal representative of the angular position of the shaft comprises a first signal obtained from the beam of light after passage through said analyzing means with a second signal obtained from the beam of light before passage through said analyzing means.

3. The optical shaft position encoder of claim 1 wherein the means deriving a signal representative of the angular position of the shaft is a digital time interval counting means.

4. An optical shaft position encoder comprising: means for producing a beam of light; rotating polarizer means for polarizing said beam of light and for modulating the angle of polarization of said beam of light at a given frequency; means for analyzing said beam of modulated polarized light, said last-mentioned means rotated in unison with the shaft; and means deriving from said analyzing means a signal representative of the angular position of the shaft by comparing the signal emerging from said analyzing means with a signal representative of the modulating of the angle of polarization of said beam of light.

5. The optical shaft encoder of claim 4 wherein the means deriving a signal representative of the angular position of the shaft is a digital time interval counting means.

6. An optical shaft position encoder comprising: means for producing a substantially parallel beam of light; a rotating polarizer for polarizing said light and for modulating the angle of polarization of said light; a semitransparent beam splitter disposed at an angle to the axis of said beam of modulated polarized light to allow said light to be propagated therethrough; an analyzer mounted on one end of a rotating shaft whose angular position is to be determined; a mirror placed behind said analyzer for reflecting said light back through said analyzer toward the reflective face of said semitransparent beam splitter whereby said beam light is reflected at an angle to the original axis thereof; detector means for supplying an electrical signal in function of the intensity of the light impinging thereupon; and a digital time interval counter electrically connected to said detector means to compare a first electrical signal representative of the modulation of the angle of polarization of said light before passage through said analyzer with a second electrical signal representative of the modulation of the angle of polarization of said light after passage through said analyzer, whereby the phase differential between said first and second signals is representative of the angular position of the shaft.

7. The optical shaft encoder of claim 6 wherein the means deriving a signal representative of the angular position of the shaft is a digital time interval counting means.

8. A method for determining the angular position of a shaft comprising: producing a beam of light; polarizing said beam of light; modulating the angle of polarization of said beam of light at a given frequency; analyzing said beam of modulated polarized light by means of an analyzer rotated in unison with the shaft; and deriving from said analyzing means a signal representative of the angular position of the shaft by comparing the signal emerging from said analyzer with a signal representative of the modulating of the angle of polarization of said beam of light.

9. The method of claim 8 wherein modulating the angle of polarization of said beam of light is by a pair of Pockels cells.

10. The method of claim 8 wherein modulating the angle of polarization of said beam of light is by rotating a polarizer.

11. The method of claim 8 wherein deriving a signal representative of the angular position of the shaft is by a digital time interval counting means.

12. The method of claim 9 further comprising causing a predetermined phase retardation between the wave components of said beam of polarized light.

13. A method for optically determining the angular position of a shaft comprising: producing a substantially parallel beam of light; polarizing said light; modulating the angle of polarization of said light; splitting said beam of polarized light by means of a semitransparent beam splitter disposed at an angle to the axis of said beam to allow said light to be propagated therethrough; analyzing said light propagated through said beam splitter by means of an analyzer mounted on one end of a rotating shaft whose angular position is to be determined; a mirror behind said analyzer for reflecting said light back through said analyzer toward the reflective face of said semitransparent beam splitter whereby said beam of light is reflected at an angle to the original axis thereof; detecting said light by way of detector means for supplying electrical signals in function of the intensity of the light impinging thereupon; and comparing a first electrical signal representative of the modulation of the angle of polarization of said light after passage through said analyzer for obtaining a phase differential signal between said first and second signals which is representative of the angular position of the shaft.

14. The method of claim 13 wherein modulating the angle of polarization of said beam of light is by a pair of Pockels cells.

15. The method of claim 13 wherein modulating the angle of polarization of said beam of light is by rotating a polarizer.

16. The method of claim 13 wherein deriving a signal representative of the angular position of the shaft is by digital time interval counting means.

17. The method of claim 14 further comprising causing a predetermined phase retardation between the wave components of said beam of polarized light.

UNITED STATES PATENT OFFICE
CERTIFICATE OF CORRECTION

Patent No. 3,584,959　　　　　　　　　Dated　June 15, 1971

Inventor(s)　CARLO DEL CARLO ET AL

It is certified that error appears in the above-identified patent and that said Letters Patent are hereby corrected as shown below:

IN THE SPECIFICATION

Column 1, line 66, after "collimated" cancel "5." and insert -- polarized --;

line 69, after "phase" insert -- by --;

Column 2, in the formula between lines 27 and 35, replace the expression "$\sqrt{\frac{2}{2}}$" by -- $\frac{\sqrt{2}}{2}$ -- (three occurrences);

in the formula between lines 66 and 70, replace the expression "$\sqrt{\frac{2}{4}}$" by -- $\frac{\sqrt{2}}{4}$ -- (two occurrences);

Column 3, line 8, change the expression "$1 - \sqrt{2}$" to -- $1 - \frac{\sqrt{2}}{2}$ --;

line 39, correct the equation to --

$$\Delta t = 1.54 \times 10^{-6} f^{-1} \quad (2)$$

line 42, change the expression "$1 \times 10^{19}$" to -- $1 \times 10^{-9}$ --;

PATENT NO. 3,584,959

IN THE SPECIFICATION

Column 3, line 43, change the expression "$\pm 5 \times 10^{110}$" to -- $\pm 5 \times 10^{-10}$ --

IN THE CLAIMS

Column 5, line 44, change "comprises" to -- compares --

Column 6, line 56, after "light" insert -- before passage through said analyzer with a second electrical signal representative of the modulation of the angle of polarization of said light --

Signed and sealed this 16th day of November 1971.

(SEAL)
Attest:

EDWARD M. FLETCHER, JR.    ROBERT GOTTSCHALK
Attesting Officer    Acting Commissioner of Patents